United States Patent
Chiu

(10) Patent No.: US 11,995,224 B2
(45) Date of Patent: May 28, 2024

(54) DATA STORAGE DEVICE AND DATA PROCESSING METHOD

(71) Applicant: Silicon Motion, Inc., Hsinchu County (TW)

(72) Inventor: Shen-Ting Chiu, Miaoli County (TW)

(73) Assignee: Silicon Motion, Inc., Hsinchu County (TW)

(*) Notice: Subject to any disclaimer, the term of this patent is extended or adjusted under 35 U.S.C. 154(b) by 360 days.

(21) Appl. No.: 17/329,175

(22) Filed: May 25, 2021

(65) Prior Publication Data
US 2021/0374294 A1 Dec. 2, 2021

(30) Foreign Application Priority Data
May 26, 2020 (TW) .................. 109117430

(51) Int. Cl.
*G06F 21/79* (2013.01)
*G06F 21/60* (2013.01)
*G06F 21/62* (2013.01)

(52) U.S. Cl.
CPC ............ *G06F 21/79* (2013.01); *G06F 21/604* (2013.01); *G06F 21/6209* (2013.01)

(58) Field of Classification Search
CPC .... G06F 21/79; G06F 21/604; G06F 21/6209; G06F 12/14
See application file for complete search history.

(56) References Cited

U.S. PATENT DOCUMENTS

| | | | | | |
|---|---|---|---|---|---|
| 5,974,500 | A | * | 10/1999 | Maletsky | G06F 21/79 365/120 |
| 10,514,860 | B2 | * | 12/2019 | Oh | G06F 3/0604 |
| 11,573,915 | B2 | * | 2/2023 | Lee | G06F 13/1642 |
| 2003/0066013 | A1 | * | 4/2003 | Maple | G11B 20/1833 |
| 2008/0046997 | A1 | * | 2/2008 | Wang | G06F 21/79 726/16 |
| 2011/0040925 | A1 | * | 2/2011 | Frost | G06F 12/0246 711/E12.008 |
| 2011/0282842 | A1 | * | 11/2011 | Popovski | G06F 11/1435 707/649 |
| 2013/0145085 | A1 | * | 6/2013 | Yu | G06F 12/0246 711/103 |

(Continued)

FOREIGN PATENT DOCUMENTS

TW 201928958 A 7/2019

*Primary Examiner* — Shanto Abedin
(74) *Attorney, Agent, or Firm* — Winston Hsu

(57) ABSTRACT

A memory controller coupled to a memory device and configured to control access operations of the memory device includes a data protection engine and a microprocessor. The data protection engine is configured to generate protection information according to data received from a host device. The microprocessor is configured to detect a status of the memory device in response to one or more write operations for writing the data to the memory device, determine whether a portion of the data has to be excluded when generating the protection information corresponding to the data according to the status and accordingly generate a determination result, and store the protection information and the determination result together in the memory device. The determination result indicates which portion of the data is utilized to generate the protection information.

10 Claims, 5 Drawing Sheets

(56) References Cited

U.S. PATENT DOCUMENTS

| | | | |
|---|---|---|---|
| 2015/0370727 A1* | 12/2015 | Hashimoto | G06F 21/64 |
| | | | 711/163 |
| 2017/0115905 A1 | 4/2017 | Tsao | |
| 2018/0054217 A1 | 2/2018 | Schwaderer | |
| 2019/0114177 A1* | 4/2019 | Chung | G06F 9/4403 |
| 2019/0196984 A1* | 6/2019 | Lasko | G06F 21/79 |
| 2019/0251275 A1* | 8/2019 | Ramrakhyani | G06F 21/6218 |
| 2019/0303304 A1* | 10/2019 | Lee | G06F 12/1466 |
| 2020/0064903 A1* | 2/2020 | Blodgett | G11C 5/144 |
| 2020/0065011 A1* | 2/2020 | Lee | G11C 16/22 |

\* cited by examiner

DATA STORAGE DEVICE AND DATA PROCESSING METHOD

BACKGROUND OF THE INVENTION

1. Field of the Invention

The invention relates to a data processing method, more particular to a data processing method for effectively protecting data stored in a memory device.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)—have been used widely for a variety of purposes. Therefore, effective control of access to these data storage devices is an important issue.

In order to improve access performance of the data storage device and protect the data stored in the memory device, a novel data processing method for effectively protecting data stored in the memory device and avoiding degradation of the access performance of the data storage device due to implementation of a data protection mechanism is proposed.

SUMMARY OF THE INVENTION

It is an objective of the invention to effectively protect data stored in the memory device and to avoid degrading the access performance of the data storage device due to implementation of a data protection mechanism.

According to an embodiment of the invention, a memory controller coupled to a memory device and configured to control access operations of the memory device comprises a data protection engine and a microprocessor. The data protection engine is configured to generate protection information according to data received from a host device. The microprocessor is configured to detect a status of the memory device in response to one or more write operations of the memory device for writing the data to the memory device, determine whether a portion of the data has to be excluded when the data protection engine is generating the protection information corresponding to the data according to the status of the memory device and accordingly generate a determination result, and store the protection information and the determination result together in the memory device. The determination result indicates which portion/portions of the data is/are utilized to generate the protection information.

According to another embodiment of the invention, a data processing method, performed by a memory controller coupled to a memory device, comprises: detecting a status of the memory device in response to one or more write operations of the memory device for writing data received from a host device to the memory device; determining whether a portion of the data has to be excluded when generating protection information corresponding to the data according to the status of the memory device and accordingly generating a determination result; generating the protection information corresponding to the data according to the data and the determination result; and storing the protection information and the determination result together in the memory device. The determination result indicates which portion/portions of the data is/are utilized to generate the protection information.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
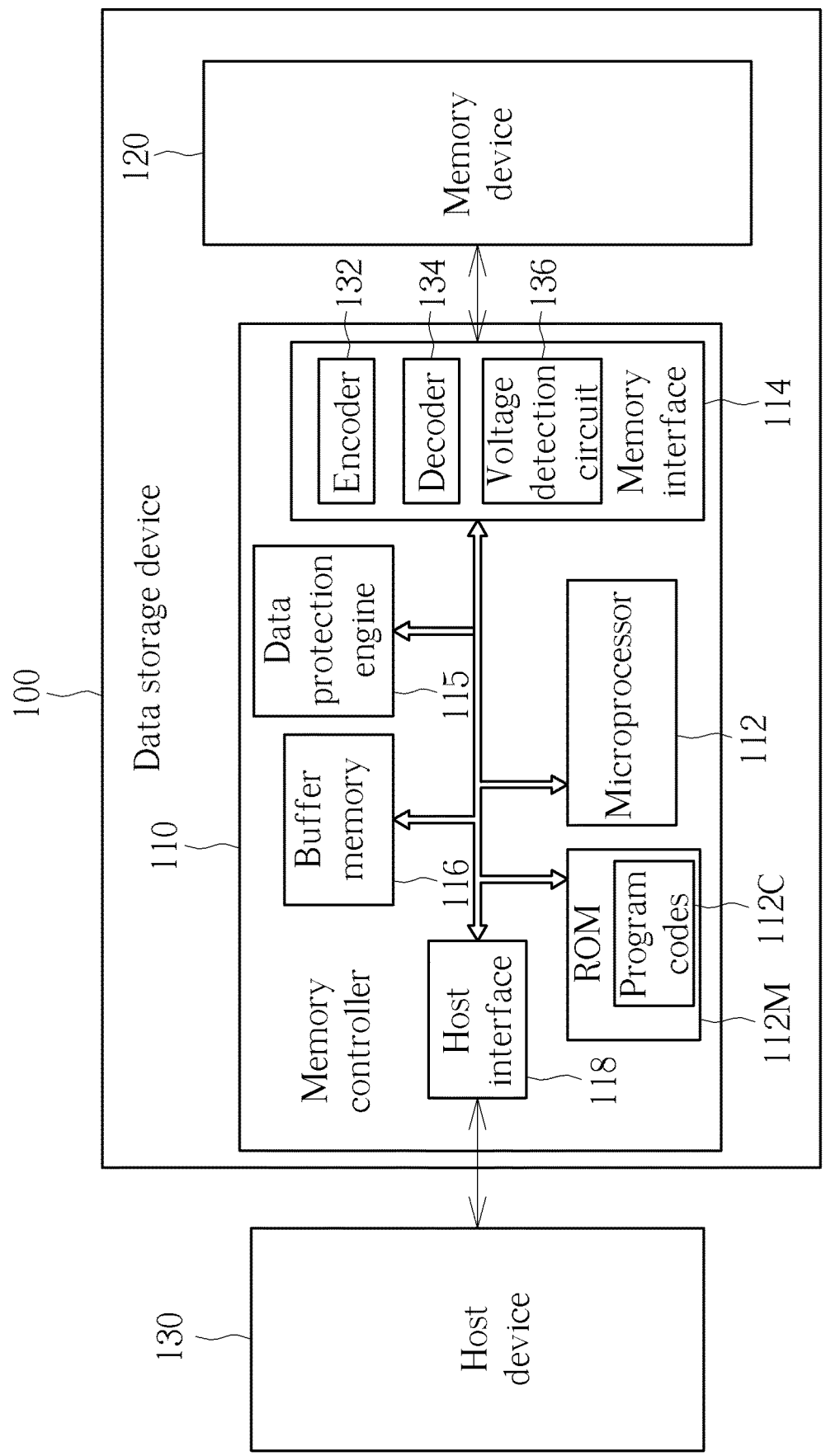
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120, such as a flash memory module, and a memory controller 110. The memory controller 110 is configured to access the memory device 120. According to an embodiment of the invention, the memory controller 110 may comprise a microprocessor 112, a Read Only Memory (ROM) 112M, a memory interface 114, a data protection engine 115, a buffer memory 116 and a host interface 118. The ROM 112M is configured to store program codes 112C. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but not limited to: one or more program modules related to memory access (e.g. read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error. The memory interface 114 may comprise an encoder 132, a decoder 134 and a voltage detection circuit 136. The encoder 132 is configured to encode the data to be written into the memory device 120 to generate the corresponding correction code (or, may be named as an Error Correction Code (ECC)). The decoder 134 is configured decode the data read out from the memory device 120. The voltage detection circuit 136 is configured to detect a voltage level of the memory device 120, for example, the voltage level of the power source (hereinafter called the power voltage), and accordingly generate a detection result. The microprocessor 112 may determine whether power voltage change has occurred in the memory device 120 (for example, unstable power voltage) or whether a sudden power off (SPO) has occurred. The data protection engine 115 is configured to generate protection information corresponding to the data received from the host device 130 and configured to repair or recover the damaged data or lost data according to the protection information. The protection information may be encoded information generated based on the data to be protected. For example, the protection information may be information regarding the parity bits of the data. When a portion of data protected by predetermined protection information is damaged or lost, the data protection engine 115 may perform corresponding decoding operations based on the predetermined protection information and the remaining portion of the data protected by the predetermined protection information, thereby deriving the damaged or the lost portion of data.

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130. The host interface 118 may be regarded as a front end controller engine, which is configured to transmit communication signals between the memory controller 110 and the host device 130, transmit the read/write data of the host device 130 and control the scheduling of the read/write tasks.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the MMC interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a Random Access Memory (RAM), such as a Static RAM (SRAM), but the invention should not be limited thereto. In other embodiments, the buffer memory 116 may be a Dynamic RAM (DRAM).

In an embodiment of the invention, the data storage device 100 may be a portable storage device (for example, the memory card in compliance with the SD/MMC, CF, MS, XD and/or UFS standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks and/or the Triple-Level Cell (TLC) memory blocks. The memory cell of the SLC memory block is configured to store one bit data, the memory cell of the MLC memory block is configured to store two bits data, and the memory cell of the TLC memory block is configured to store three bits data. According to an embodiment of the invention, the memory device 120 may be a 3D NAND-type flash memory device.

Generally, in order to protect the memory device from having valid data loss due to the damage of the memory cells, the protection mechanism adopted by Redundant Array of Independent Disks (RAID) technology may be utilized in the memory device for data protection. In the protection mechanism adopted by RAID, parity information is calculated by the memory controller based on the data written in the memory device. When valid data loss occurs, the parity information can be used to reversely derive the content of lost valid data.

However, in some circumstances, the damage may have already occurred during the time when the data is being written into the memory device. When detecting that damage has occurred on a portion of data written in the memory device, the memory controller triggers a data transfer procedure so as to move and reorganize the undamaged data (that is, the correct data) to a predetermined memory area, and recalculate the protection information based on the data stored in this predetermined memory area for protecting the remaining undamaged data. However, since the protection mechanism works only after the protection information is calculated, if there is any error occurred during the data transfer, the error data cannot be recovered since the data is actually not protected during the data transfer. Therefore, there is a risk of unrecoverable data error in the data transfer procedure. In addition, the data transfer and reorganization are also time consuming operations.

To solve the aforementioned problems, a novel data processing method for effectively protecting data stored in a memory device and avoiding degradation of access performance of the data storage device due to implementation of the data protection mechanism is proposed.

According to an embodiment of the invention, besides storing the protection information, the memory controller 110 may also store the corresponding information that indicates based on which portion(s) of the data the protection information is generated in the memory space that is used to store the protection information. In this manner, when the memory controller 110 determines that a portion of the data is unnecessary or cannot be encrypted or protected, the memory controller 110 may directly skip this portion and perform the data encryption or protection operations only on the remaining portion(s). Therefore, there is no need to perform the aforementioned data transfer for the purpose of collecting a predetermined amount of correct data. The corresponding information stored by the memory controller 110 that indicates based on which portion(s) of the data the protection information is generated may be utilized when decoding the data. For example, when the memory controller 110 determines that another portion of the data is lost or damaged, the memory controller 110 can know based on which portion(s) of the data the protection information is generate based on the stored information and can correctly access the data that it needs to perform the data recovery operations.

Figure 2:
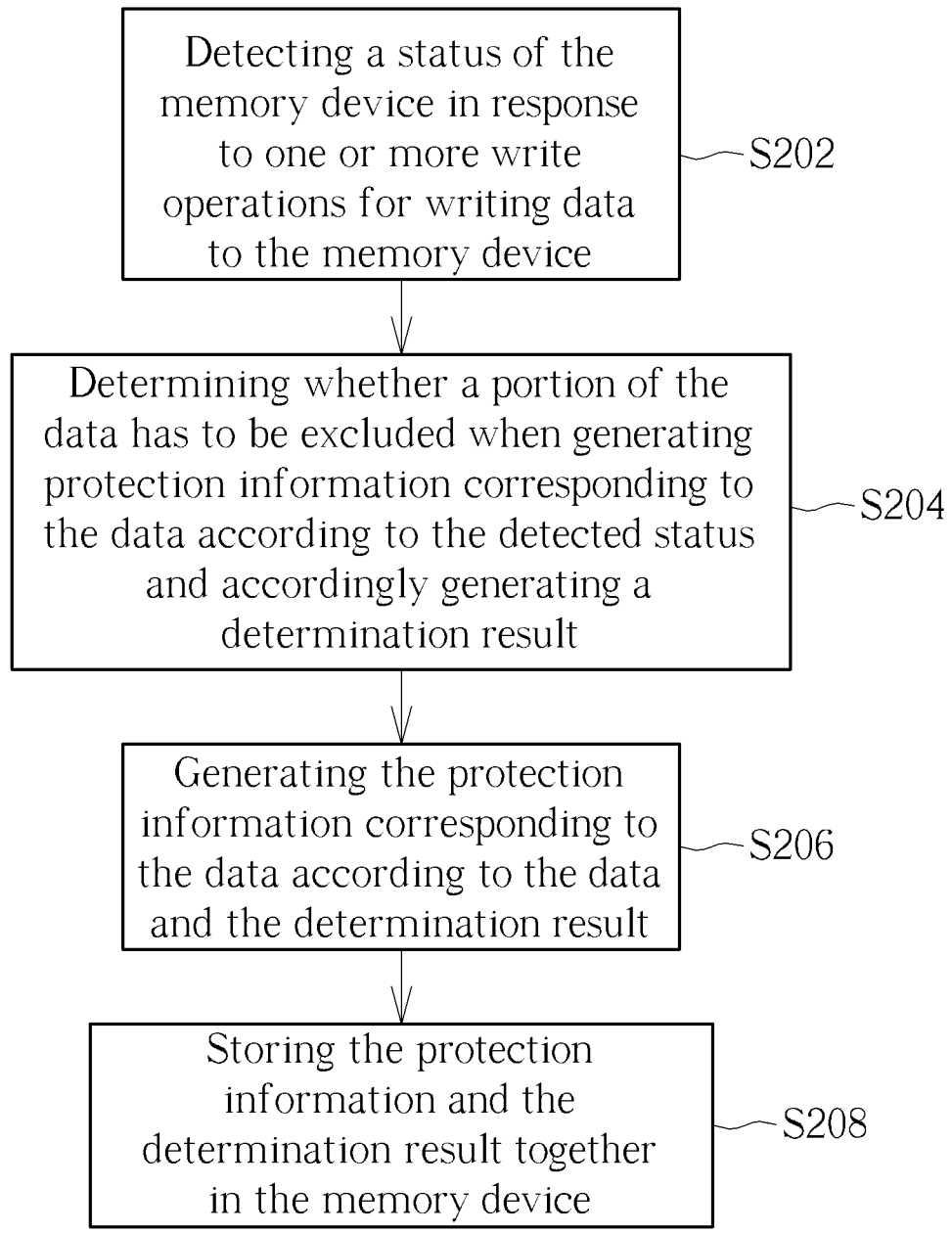
FIG. 2 is a flow chart of the data processing method according to an embodiment of the invention.

FIG. 2 is a flow chart of the data processing method according to an embodiment of the invention. The data processing method may be performed by the memory controller 110 or one or more components comprised in the memory controller 110, and may comprise the following steps:

Step S202: in response to one or more write operations for writing data received from the host device 130 to the memory device 120, detecting a status of the memory device 120 or detecting a status of the data being written in the memory device 120 based on the one or more write operations.

Step S204: determining whether a portion of the data has to be excluded when generating protection information corresponding to the data according to the status detected in step S202 and accordingly generating a determination result.

Step S206: generating the protection information corresponding to the data according to the data and the determination result. For example, the memory controller 110 (or, the microprocessor 112) may instruct the data protection engine 115 which portion/portions of the data should be used or which portion of the data should be excluded when generating the protection information. The data protection engine 115 may then generate the corresponding protection information according to the non-excluded portion(s) of the data in compliance with the instruction of the memory controller 110.

Step S208: storing the protection information and the determination result together in the memory device.

It should be noted that if substantially the same result can be obtained, the steps are not necessarily performed in accordance with the execution order shown in FIG. 2, and some other steps can be inserted therein or the execution order of some steps can be interchanged. For example, steps S204 and S206 can be performed at the same time or the order of execution of steps S204 and S206 can be interchanged. To be more specific, the data received from the host device 130 may be stored or buffered in the buffer memory 116. Suppose that the data protection engine 115 is designed to generate protection information for a super page based on content of the data stored in this super page, and the basic protection unit of the data protection engine 115 is one page, where one super page comprise a first number of pages, at the same time when the data of this super page currently buffered in the buffer memory 116 is being written into the memory device 120, the data protection engine 115 may generate the protection information for the data of all pages comprised in this super page by default according to the data stored in the buffer memory 116. That is, the data protection engine 115 may generate the protection information based on the data stored in the buffer memory 116 first. When the microprocessor 112 determines in step S204 that one or more pages comprised in this super page should be excluded when generating the protection information, the microprocessor 112 may further instruct the data protection engine 115 to perform a data exclusion operation to exclude or remove content related to said one or more pages from the protection information, and the result of the aforementioned data exclusion operation is equivalent to that of the data protection engine 115 generating the corresponding protection information according to the other page(s) not comprising said one or more pages of this super page. Or, the microprocessor 112 may instruct the data protection engine 115 to exclude said one or more pages from the pages comprised in this super page and regenerate the corresponding protection information. In other words, the data protection engine 115 finally regenerates the corresponding protection information according to the other page(s) not comprising said one or more pages of this super page. Therefore, when it is determined that one or more pages should be excluded, the protection information corresponding to this super page is actually generated based on less than the first number of pages.

In the embodiments of the invention, the determination result may be utilized to indicate which portion/portions of the data is/are utilized to generate the protection information (for example, which page(s) of one super page). In addition, according to an embodiment of the invention, in step S208, the memory controller 110 may represent the determination result by a plurality of bits. For example, the memory controller 110 may establish a bitmap or a bit table for the protection information according to the determination result, for recording which portion/portions of the data is/are utilized to generate the corresponding protection information, and may store the protection information and the bitmap in the same memory space, such as one page (for example, one physical page). The size of one physical page may be, for example but not limited to, 16K byte, and one physical page may comprise a data region and a spare region. The memory controller 110 may store the protection information in the data region and store the determination result in the spare region as a portion of the meta data of this memory space.

When the memory controller 110 (or, the microprocessor 112) determines that a portion of the data stored in the memory device 120 is damaged or lost, the memory controller 110 may first access the memory device 120 to obtain the protection information and the determination result (or, the bitmap) corresponding to the damaged or lost portion of data and may instruct the data protection engine 115 to use which portion of the data to decode the corresponding protection information according to determination result, so as to derive or recover the damaged or lost portion of the data.

As discussed above, according to an embodiment of the invention, the determination result may be represented by a plurality of bits, and one bit is utilized to indicate whether a predetermined storage unit of the data has to be excluded. The predetermined storage unit may be designed to be the same size as the basic protection unit of the protection information (that is, the basic protection unit of the data protection engine 115), or the predetermined storage unit may be greater than the basic protection unit of the protection information (that is, the basic protection unit of the data protection engine 115).

For example, suppose that the basic protection unit is currently set to one page, the size of protection information generated by the data protection engine 115 may be one page as well, and the protection information may be, for example, the parity bits of one page.

In an embodiment of the invention, the size of the predetermined storage unit may also be set to one page. Therefore, one bit of the determination result may be utilized to indicate whether the data of a corresponding page has to be excluded when generating the protection information. In this embodiment, when the data protection engine 115 generates the protection information according to all pages comprised in a single-plane super page, the determination result corresponding to this single-plane super page may comprise said first number of bits.

Or, in another embodiment of the invention, the size of the predetermined storage unit may be set to the size of a multi-plane page, wherein a multi-plane page may comprise, for example but not limited to, two pages in different planes. Therefore, one bit of the determination result may be utilized to indicate whether the data of a corresponding multi-plane page (for example, two pages) has to be excluded when generating the protection information. In this embodiment, when the data protection engine 115 generates the protection information according to all pages comprised in a multi-plane super page, the determination result corresponding to this multi-plane super page may comprise said first number of bits, and each bit may be compressed information to indicate whether the data of multiple pages has to be excluded when generating the corresponding protection information.

It should be noted that in the embodiments of the invention, the data protection engine 115 may flexibly generate the protection information for the data of different sizes, and the basic protection unit is not limited to be one page. For example, the data protection engine 115 may generate protection information for a single-plane or a multiple-plane super page according to the content of this super page, generate protection information for a memory block according to the content of this memory block, generate protection information for a super memory block according to the content of this super memory block (where one super memory block comprises a plurality of memory blocks), or others. Therefore, the basic protection unit of the data protection engine 115 may be one page, one multiple-plane page, one super page, one memory block, or others.

Figure 3:
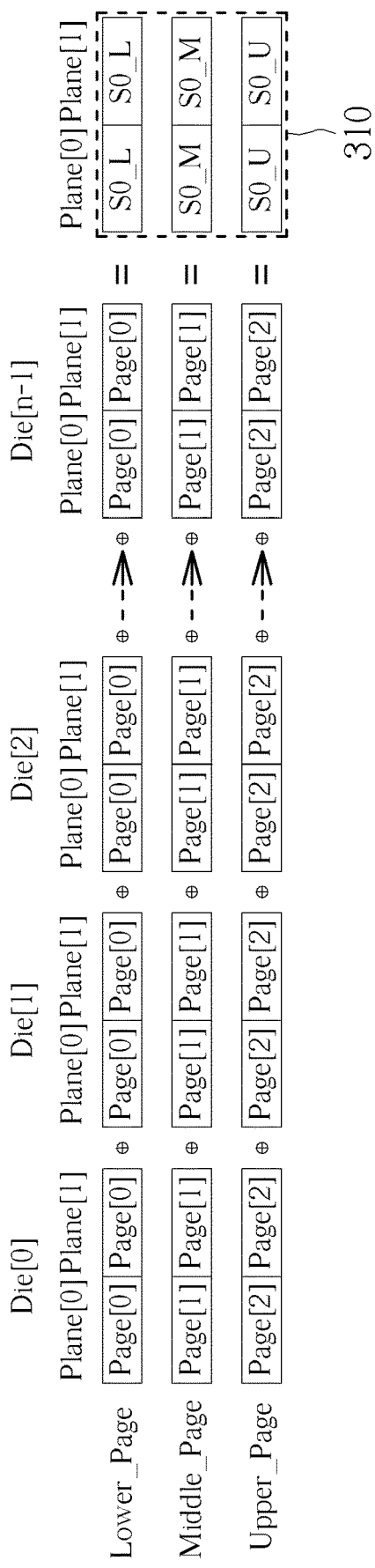
FIG. 3 is a schematic diagram of generating the protection information corresponding to a plurality of multiple-plane pages according to a first embodiment of the invention.

FIG. 3 is a schematic diagram of generating the protection information corresponding to a plurality of multiple-plane pages according to a first embodiment of the invention. In this embodiment, the memory device 120 may comprise a plurality of flash memory chips (or, memory dies), and the data protection engine 115 may tie n memory dies, such as the memory dies Die[0]~Die[n−1] shown in FIG. 3, together for encoding, so as to generate the corresponding protection information, where n is a positive integer. Each memory die may comprise one or more planes, such as the planes Plane[0] and Plane[1] shown in FIG. 3. Each plane may comprise a plurality of pages, such as the pages Page[0], Page[1] and Page[2] shown in FIG. 3. In this embodiment, suppose that the memory device 120 is programmed by a Triple-Level Cell (TLC) programming scheme, one physical page may correspond to three logical pages, such as the lower, middle and upper pages (logical pages): Lower_Page, Middle_Page and Upper_Page shown in FIG. 3. On each plane, the pages Page[0], Page[3], Page[6] and Page[9] may be the lower pages, the pages Page[1], Page[4], Page[7] and Page[10] may be the middle pages, the pages Page[2], Page[5], Page[8] and Page[11] may be the upper pages, and the rest may be deduced by analogy.

In the embodiments shown in FIG. 3, the data protection engine 115 may group n memory dies as a protection group, and may generate protection information according to the data corresponding to each page on each plane in this n memory dies. For example, suppose that n=8, the data protection engine 115 may group 8 memory dies as a protection group, wherein one protection group may comprise the memory dies Die[0]~Die[7] shown in FIG. 3. The pages in the memory dies Die[0]~Die[7] may form a plurality of super pages, where one super page may comprise the first number of pages, such as 8 pages. It should be noted that said super mage may be a single-plane super page or a multiple-plane super page. For example, the first page Page[0] on the first plane Plane[0] of the memory dies Die[0]~Die[7] may be grouped together and form a single-plane super page, the first page Page[0] on the second plane Plane[1] of the memory dies Die[0]~Die[7] may be grouped together and form another single-plane super page, or, the first page Page[0] on two planes of the memory dies Die[0]~Die[7] may be grouped together and form a multiple-plane super page.

In the embodiments of the invention, a union of the lower, middle and upper pages may form a string. The data protection engine 115 may perform exclusive or (XOR) operation on the data corresponding to the lower, middle and upper pages, respectively, to obtain the protection information corresponding to one string. For example, the protection information 310 corresponds to the first string shown in FIG. 3. The protection information 310 comprises the protection information S0_L, S0_M and S0_U obtained by the data protection engine 115, wherein the protection information S0_L may be obtained by performing the XOR operation on the data corresponding to the first page Page[0] (the lower page) of the memory dies Die[0]~Die[7], the protection information S0_M may be obtained by performing the XOR operation on the data corresponding to the second page Page[1] (the middle page) of the memory dies Die[0]~Die

[7] and the protection information S0_U may be obtained by performing the XOR operation on the data corresponding to the third page Page[2] (the upper page) of the memory dies Die[0]~Die[7]. The protection information S0_L, S0_M and S0_U on the first plane Plane[0] and the second plane Plane[1] are respectively utilized to protect the data corresponding to the lower, middle and upper pages comprised in the first string of the corresponding plane.

Figure 4:
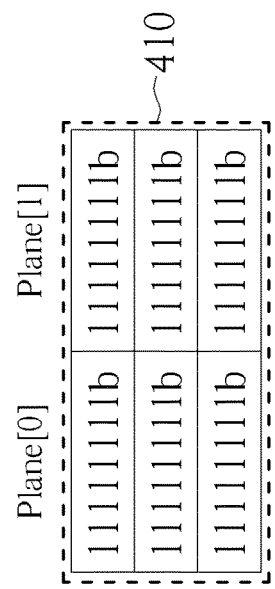
FIG. 4 shows an exemplary bitmap established based on the protection information shown in FIG. 3.

FIG. 4 shows an exemplary bitmap established based on the protection information 310 shown in FIG. 3. In this embodiment, suppose the memory controller 110 determines that all portions of the data comprised in the first string can be utilized for generating the protection information corresponding to the first string (that is, no page shown in FIG. 3 has to be excluded when the data protection engine 115 is generating the protection information corresponding to the data of the first string) based on the status of the memory device 120 when performing the write operations of the first string or based on the status of the data of the first string that is written in the memory device 120, the memory controller 110 may set the values of all the bits in the bitmap 410 to a corresponding value (for example, 1) to the represent that all the data is protected by the protection information 310. One byte in the bitmap 410 may correspond to one super page on one plane, and one bit in a byte is utilized to indicate whether one page comprised in the corresponding super page has to be excluded. On the other hand, when the memory controller 110 determines that one page has to be excluded, the memory controller 110 may set the corresponding bit in the bitmap 410 to another value (for example, 0), so as to indicate that this page is not protected by the protection information 310, and the memory controller 110 may instruct the data protection engine 115 to exclude this page from its super page when generating the protection information corresponding to this super page.

It should be noted that as discussed above, the protection information may also be compressed information. For example, in another embodiment of the invention, the content recorded by each bit comprised in one byte corresponding to the first plane Plane[0] and the second plane Plane[1] in the bitmap 410 may be compressed and represented by one bit. That is, the content of the bitmap 410 may be compressed into one byte.

In addition, besides being applied in the multi-plane structure as discussed above, the proposed data processing method and data protection mechanism may also be applied in the single-plane structure. For example, the content shown in FIG. 3 and FIG. 4 may be simplified to only comprise the pages in one plane. The data protection engine 115 may group the n memory dies as a protection group, and generate the protection information for each page according to the data corresponding to each page of the n memory dies.

Figure 5:
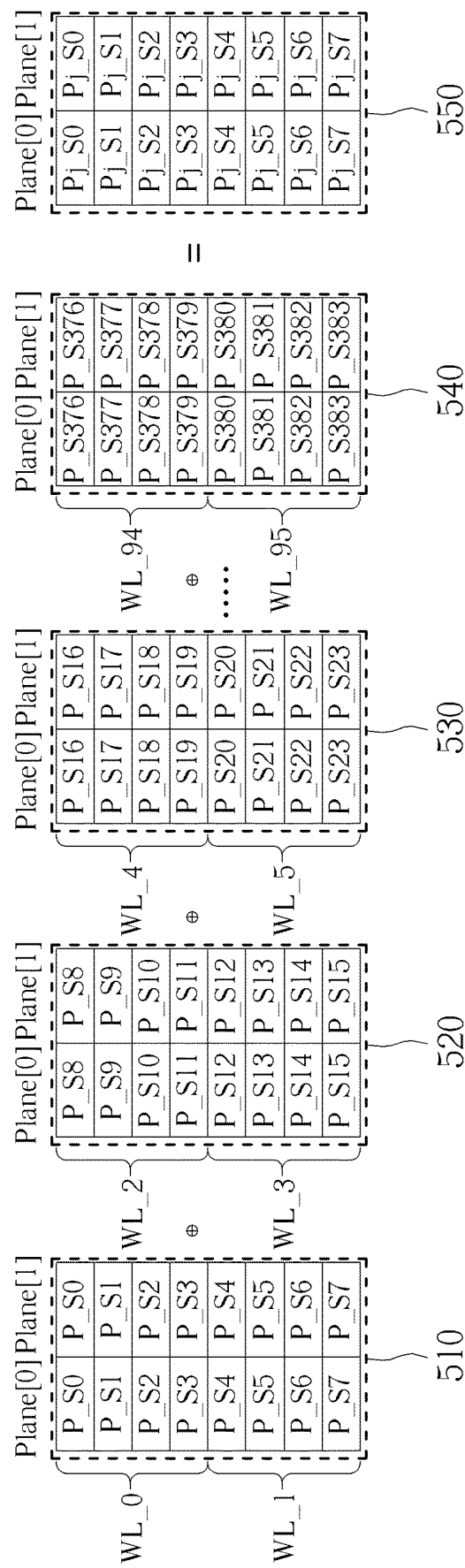
FIG. 5 is a schematic diagram of generating the protection information corresponding to a plurality of multiple-plane pages according to a second embodiment of the invention.

FIG. 5 is a schematic diagram of generating the protection information corresponding to a plurality of multiple-plane pages according to a second embodiment of the invention. The second embodiment may be an extension of the first embodiment. As discussed above, a union of the lower, middle and upper pages may form a string. Pages Page[0], Page[1] and Page[2] may form a first string S0, pages Page[3], Page[4] and Page[5] may form a second string S1, pages Page[6], Page[7] and Page[8] may form a third string S2, and so on. In the second embodiment of the invention, the data protection engine 115 may repeatedly perform the operations as illustrated in the first embodiment to obtain the protection information corresponding to different strings.

As shown in FIG. 5, the protection information P_S0 is the protection information corresponding to the first string S0, and the protection information P_S0 may further comprise the protection information S0_L, S0_M and S0_U corresponding to the lower, middle and upper pages in the first string as shown in FIG. 3. The protection information P_S1 is the protection information corresponding to the second string S1, and the protection information P_S1 may further comprise the protection information corresponding to the lower, middle and upper pages in the second string, and the rest may be deduced by analogy. In addition, in the second embodiment of the invention, a unit of four strings may form a word line (WL). Therefore, the protection information 510 may comprise the protection information corresponding to the word lines WL_0 and WL_1, the protection information 520 may comprise the protection information corresponding to the word lines WL_2 and WL_3, the protection information 530 may comprise the protection information corresponding to the word lines WL_4 and WL_5, the protection information 540 may comprise the protection information corresponding to the word lines WL_94 and WL_95, and the rest may be deduced by analogy. In this embodiment, each memory die may comprise 1152 pages, which is equivalent to 384 strings, and is also equivalent to 96 word lines.

In the second embodiment of the invention, when obtaining the protection information P_S0~P_S383 corresponding to the 384 strings, the data protection engine 115 may further group the protection information corresponding to the two word lines together as a set of protection information (or, a union), such as the protection information 510~540. The data protection engine 115 may further performing the XOR operation on the unions to obtain the protection information 550 corresponding to a super memory block, wherein the protection information 550 may comprise the protection information Pj_S0~Pj_S7 of two planes, the protection information Pj_S0 of the first plane Plane[0] and the protection information Pj_S0 of the second plane Plane[1] are the protection information obtained by the data protection engine 115 by respectively performing the XOR operation on the protection information P_S0, P_S8, P_S16 . . . P_S376 of the first plane Plane[0] and the second plane Plane[1], the protection information Pj_S1 of the first plane Plane[0] and the protection information Pj_S1 of the second plane Plane[1] are the protection information obtained by the data protection engine 115 by respectively performing the XOR operation on the protection information P_S1, P_S9, P_S17 . . . P_S377 of the first plane Plane[0] and the second plane Plane[1], and the rest may be deduced by analogy.

Figure 6:
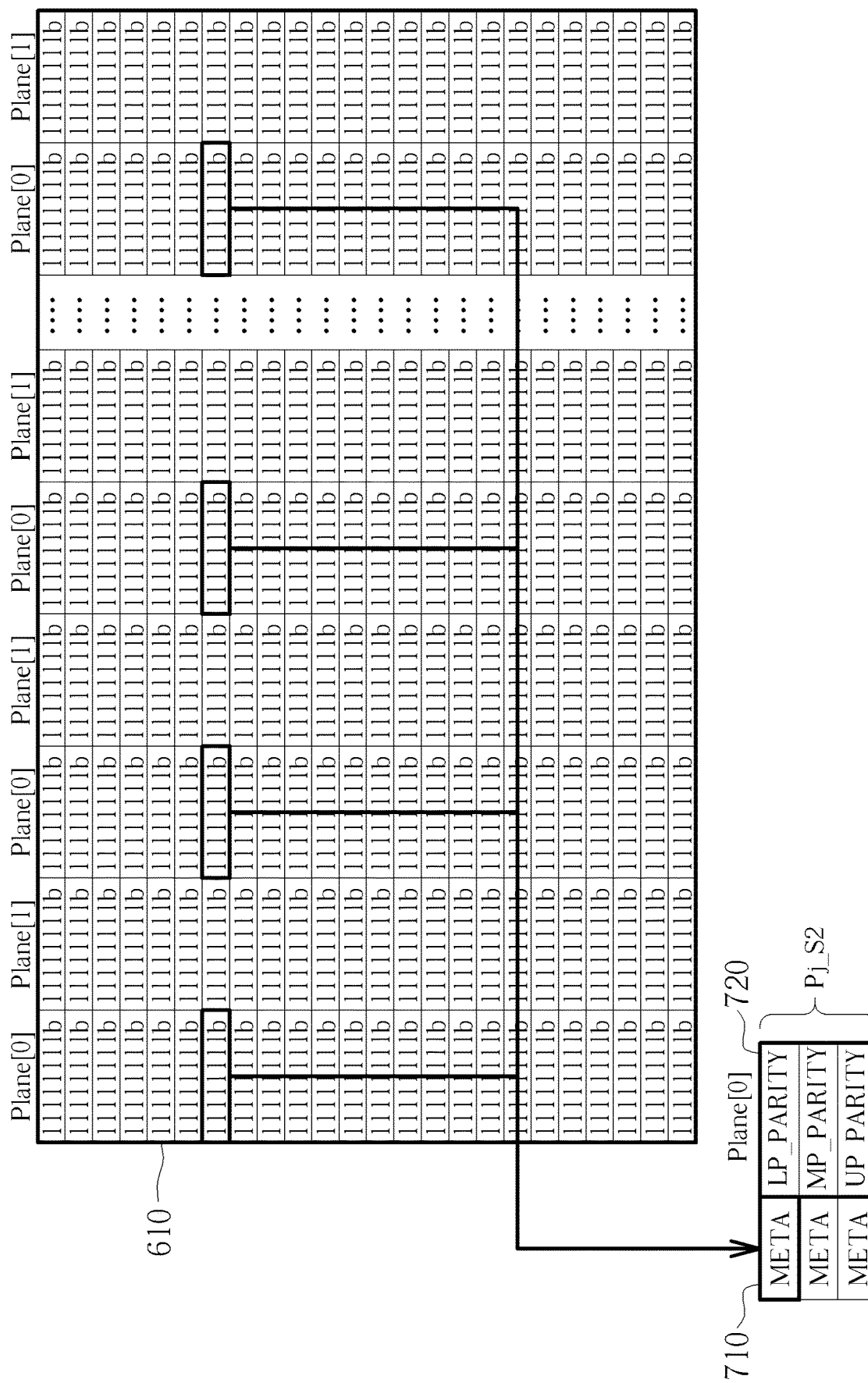
FIG. 6 shows an exemplary bitmap established based on the protection information shown in FIG. 5.

FIG. 6 shows an exemplary bitmap established based on the protection information shown in FIG. 5. One byte in the bitmap 610 may correspond to one super page on one plane, and one bit in a byte is utilized to indicate whether one page comprised in the corresponding super page has to be excluded. Similarly, when the memory controller 110 determines that one page has to be excluded, the memory controller 110 may set the corresponding bit in the bitmap 610 to another value (for example, 0), so as to indicate that this page is not protected by the protection information 550.

According to an embodiment of the invention, the memory controller 110 may store the protection information and the corresponding bitmap (that is, the determination result) together in a physical page, wherein the protection information is stored in the data region and the determination result is stored in the spare region as a portion of the meta data (the meta data META as shown in FIG. 6) of the this physical page. As shown in FIG. 6, the data region 720 stores the content of the protection information Pj_S2 on the first plane Plane[0], which is the protection information obtained by the data protection engine 115 by performing XOR operations on the protection information P_S2, P_S10, P_S18 . . . P_S378 of the first plane Plane[0], and may further comprise the protection information LP_Parity, MP_Parity and UP_Parity corresponding to the lower, middle and the upper pages. The bitmap associated with each protection information is stored in the corresponding spare region. As shown in FIG. 6, the spare region 710 may be utilized to store the bitmap corresponding to the protection information LP_Parity of the lower page of the protection information Pj_S2 on the first plane Plane[0], where the bits corresponding to the protection information LP_Parity of the lower page of the protection information Pj_S2 on the first plane Plane[0] are highlighted by being framed by thick black lines, and in FIG. 6, by pointing the framed bits to the spare area 710, the contents of the bits are stored in the spare region 710 is shown.

According to an embodiment of the invention, the aforementioned determination result or the bitmap may be buffered in the buffer memory 116 during the encoding procedure of the data protection engine 115, and may be written in the memory device 120 together with the protection information after the protection information is generated. In addition, in the embodiments of the invention, the data protection engine 115 may generate the final protection information according to a predetermined number of pages and/or a predetermined amount of protection information by default. For example, in the first embodiment of the invention, the data protection engine 115 may generate the protection information according to the first number of pages, such as the protection information of one super page as shown in FIG. 3, and in the second embodiment of the invention, the data protection engine 115 may further generate the protection information of a super memory block as shown in FIG. 5 according to the union of a second amount of protection information. Since the aforementioned predetermined number and the predetermined amount are already known, when a portion of the data is damaged or lost, the data protection engine 115 may derive the storage location of the protection information corresponding to the lost or damaged data according to the information regarding the predetermined number and the predetermined amount (for example, the first number, the second amount, etc.) and may obtain the bitmap corresponding to this protection information by accessing the meta data according to the derived storage location. Then, the data protection engine 115 may perform the corresponding decoding operation according to the content of the obtained protection information and the bitmap to derive the content of the lost or damaged data.

In addition, in the embodiment of the invention, the aforementioned data exclusion operation may be a reverse operation of generating the protection information. For example, when the data protection engine 115 generates the protection information by performing XOR operation, the data exclusion operation may be a reverse operation of the XOR operation. It should be noted that the data protection engine 115 may also generate the protection information by performing other operations, and thus the invention should not be limited to only use the XOR operation to generate the protection information.

In addition, in the embodiment of the invention, since the memory controller 110 may determine whether one or more pages should be excluded according to the status of the memory device 120 or the status of the data written in the memory device 120, when the data protection engine 115 is configured to generate the protection information of a super page according to a first number of pages by default and when it is determined that one or more pages of this super page has/have to be excluded, the protection information of this super page is actually generated according to the data of less than the first number of pages.

Referring back to FIG. 2, according to an embodiment of the invention, in step S202, in response to one or more write operations of writing the data received from the host device 130 to the memory device 120, the microprocessor 112 may detect the status of the memory device 120.

For example, the microprocessor 112 may detect a status message respond by the memory device 120 after performing the write operation, so as to know whether the corresponding write operation succeeded or failed. When the status message indicates that the write operation of a first portion of the data failed, the microprocessor 112 may determine to instruct the data protection engine 115 to exclude the first portion from the data when generating the protection information, and may set the information corresponding to this determination result or the corresponding bit in the bitmap to a corresponding value (for example, 0).

For another example, the voltage detection circuit 136 may issue a massage to notify the microprocessor 112 when detecting that power voltage change (for example, voltage drop, unstable voltage, or power off of the memory device, etc.) has occurred. Based on this message, the microprocessor 112 knows the status of the memory device 120 when performing the write operation. When the status shows that power voltage change has occurred in the memory device 120 during the write operation of the first portion of the data, since unstable voltage may cause writing errors or data cannot be written, the microprocessor 112 may determine to instruct the data protection engine 115 to exclude the first portion from the data when generating the protection information, and may set the information corresponding to this determination result or the corresponding bit in the bitmap to a corresponding value (for example, 0).

For yet another example, the microprocessor 112 may also determine the status of the memory device 120 when performing the write operation according to the status of the data storage device 100. If an SPO has occurred in the data storage device 100 when performing a write operation, it is also an SPO event to the memory device 120. Since the SPO may attack the data that is being written in the memory device 120, when the status indicates that an SPO has occurred when performing the write operation of the first portion of the data, the microprocessor 112 may determine to instruct the data protection engine 115 to exclude the first portion from the data when generating the protection information, and may set the information corresponding to this determination result or the corresponding bit in the bitmap to a corresponding value (for example, 0).

According to another embodiment of the invention, in step S202, in response to one or more write operations of writing the data received from the host device 130 to the memory device 120, the microprocessor 112 may also detect the status of the data written in the memory device 120 via the one or more write operations. For example, the microprocessor 112 may read the data that has been written in the memory device 120 and try to decode the data by the decoder 134, so as to check whether there is any error occurred in the data (for example, whether there are too many error bits for the decoder 134 to correct the errors). When the status of the data in the memory device 120 shows that some error has occurred in the first portion of the data or the first portion of the data comprises uncorrectable error, the microprocessor 112 may determine to instruct the data protection engine 115 to exclude the first portion from the data when generating the protection information, and may set the information corresponding to this determination result or the corresponding bit in the bitmap to a corresponding value (for example, 0).

As discussed above, the proposed data processing method is capable of effectively protecting data stored in the memory device and avoiding degradation of the access performance of the data storage device due to implementation of the data protection mechanism. In the embodiments of the invention, besides storing the protection information, the memory controller 110 also stores the related information for indicating based on which portion of the data the protection information is generated in the same memory space storing the protection information. In this manner, when the memory controller 110 determines that a portion of data is unnecessary or cannot be encrypted or protected, the memory controller 110 may directly skip this portion and perform the data encryption or protection operations only on the remaining portion(s). Therefore, there is no need to perform the aforementioned data transfer for the purpose of collecting a predetermined amount of correct data. When the memory controller 110 determines that another portion of the data is lost or damaged, the memory controller 110 knows based on which portion(s) of the data the protection information is generate according to the stored information and then may correctly access the data that it needs to perform the data recovery operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory controller, coupled to a memory device and configured to control access operations of the memory device, comprising:
   a data protection engine, configured to generate protection information according to data received from a host device; and
   a microprocessor, configured to detect a status of the memory device in response to one or more write operations of the memory device for writing the data to the memory device, determine whether a portion of the data has to be excluded when the data protection engine is generating the protection information corresponding to the data according to the status of the memory device and accordingly generate a determination result, and store the protection information and the determination result together in the memory device,
   wherein the determination result indicates which portion/portions of the data is/are utilized to generate the protection information;
   wherein when the microprocessor determines that a first portion of the data has to be excluded when the data protection engine is generating the protection information corresponding to the data according to the status of the memory device, the microprocessor is further configured to instruct the data protection engine to exclude the first portion from the data when generating the protection information corresponding to the data, wherein:
      when the status indicates that the write operation corresponding to the first portion of the data has failed, or that power voltage change has occurred when performing the write operation corresponding to the first portion of the data, or that sudden power off has occurred when performing the write operation corresponding to the first portion of the data, the microprocessor instructs the data protection engine to exclude the first portion from the data when generating the protection information corresponding to the data.

2. The memory controller of claim 1, wherein the protection information is stored in a data region of a memory space, and the determination result is stored in a spare region of the memory space as meta data of the memory space.

3. The memory controller of claim 1, wherein the determination result is represented by a plurality of bits, one bit is utilized to indicate whether a predetermined storage unit of the data has to be excluded and wherein the predetermined storage unit is the same as a basic protection unit of the protection information.

4. The memory controller of claim 1, wherein the determination result is represented by a plurality of bits, one bit is utilized to indicate whether a predetermined storage unit of the data has to be excluded and wherein the predetermined storage unit is greater than a basic protection unit of the protection information.

5. The memory controller of claim 1, wherein the data protection engine is further configured to recover damaged or lost data, when the microprocessor determines that a second portion of the data is damaged or lost, the microprocessor is configured to access the memory device to obtain the protection information and the determination result corresponding to the data and instruct the data protection engine to use which portion/portions of the data to recover the second portion of the data according to the determination result.

6. A data processing method, performed by a memory controller coupled to a memory device, comprising:
   detecting a status of the memory device in response to one or more write operations of the memory device for writing data received from a host device to the memory device;
   determining whether a portion of the data has to be excluded when generating protection information corresponding to the data according to the status of the memory device and accordingly generating a determination result;
   generating the protection information corresponding to the data according to the data and the determination result; and
   storing the protection information and the determination result together in the memory device,
   wherein the determination result indicates which portion/portions of the data is/are utilized to generate the protection information;
   wherein step of generating the protection information corresponding to the data according to the data and the determination result further comprises:
      when it is determined that a first portion of the data has to be excluded when generating the protection information corresponding to the data according to the status of the memory device, instructing a data protection engine to exclude the first portion from the data when generating the protection information corresponding to the data, wherein:
         when the status indicates that the write operation corresponding to the first portion of the data has failed, or that power voltage change has occurred when performing the write operation corresponding to the first portion of the data, or that sudden power off has occurred when performing the write operation corresponding to the first portion of the data, it is determined that the first portion of the data has to be excluded when generating the protection information corresponding to the data.

7. The data processing method of claim 6, wherein the protection information is stored in a data region of a memory space, and the determination result is stored in a spare region of the memory space as meta data of the memory space.

8. The data processing method of claim 6, wherein the determination result is represented by a plurality of bits, one bit is utilized to indicate whether a predetermined storage unit of the data has to be excluded and wherein the predetermined storage unit is the same as a basic protection unit of the protection information.

9. The data processing method of claim 6, wherein the determination result is represented by a plurality of bits, one bit is utilized to indicate whether a predetermined storage unit of the data has to be excluded and wherein the predetermined storage unit is greater than a basic protection unit of the protection information.

10. A data processing method, performed by a memory controller coupled to a memory device, comprising:

- detecting a status of the memory device in response to one or more write operations of the memory device for writing data received from a host device to the memory device;
- determining whether a portion of the data has to be excluded when generating protection information corresponding to the data according to the status of the memory device and accordingly generating a determination result;
- generating the protection information corresponding to the data according to the data and the determination result;
- storing the protection information and the determination result together in the memory device, wherein the determination result indicates which portion/portions of the data is/are utilized to generate the protection information;
- accessing the memory device to obtain the protection information and the determination result corresponding to the data when determining that a second portion of the data is damaged or lost; and
- instructing a data protection engine to use which portion/portions of the data to recover the second portion of the data according to the determination result.

* * * * *